(12) United States Patent
Hosokawa et al.

(10) Patent No.: US 6,351,609 B1
(45) Date of Patent: Feb. 26, 2002

(54) BUILT-IN RETRACTABLE FLASH OF A CAMERA

(75) Inventors: Tetsuo Hosokawa; Katsuhiko Nozaki, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 78 days.

(21) Appl. No.: 09/598,446

(22) Filed: Jun. 22, 2000

(30) Foreign Application Priority Data

Jun. 25, 1999 (JP) ............................................. 11-179748
Jun. 25, 1999 (JP) ............................................. 11-179749

(51) Int. Cl.[7] ............................................................. G03B 15/03
(52) U.S. Cl. ......................................................... 396/177
(58) Field of Search ................................. 396/177, 176, 396/178

(56) References Cited

U.S. PATENT DOCUMENTS 5,233,378 A * 8/1993 Hosokawa et al. ......... 396/177
5,721,984 A 2/1998 Kaneko et al. .............. 396/177
5,852,752 A 12/1998 Nakanishi et al. ...... 396/177 X

* cited by examiner

Primary Examiner—W. B. Perkey
(74) Attorney, Agent, or Firm—Greenblum & Bernstein, P.L.C.

(57) ABSTRACT

A built-in retractable flash of a camera includes a light emitter to be movable between a retracted position and a light emission position; a lock lever mechanism having a lock lever, supported on a base plate, which is movable between a lock position for holding the light emitter at the retracted position and an unlock position; an electromagnetic member which controls the position of the lock lever; a position adjustment mechanism for adjusting the position of the electromagnetic member on the base plate; and first and second securing devices for securing the base plate to the camera body. The first securing device secures only the base plate to the camera body. The second securing device secures the base plate and the electromagnetic member to the camera body after the relative position between the base plate and the electromagnetic member is adjusted by the position adjustment mechanism.

20 Claims, 13 Drawing Sheets

BUILT-IN RETRACTABLE FLASH OF A CAMERA

BACKGROUND OF THE INVENTION

1. Field of the Invention

The present invention relates to a built-in retractable flash of a camera.

2. Description of the Related Art

Cameras having a pop-up electronic flash in which a light emitter rises from an accommodation position to an emission position are well-known. In a known pop-up device for a built-in electronic flash, the light emitter is supported at its opposite ends by a pair of pop-up arms whose ends are pivotally connected to a camera body. In a known lock (engagement/disengagement) apparatus which locks the light emitter in the accommodation position (retracted position) and unlocks the light emitter, engagement levers (lock levers) and disengagement levers (unlocking levers) or springs which move the engagement levers in the disengagement direction are provided on a common shaft. Such a lock apparatus is reliable since there are little spring force losses.

For instance, the disengagement levers are each held by an armature of an electromagnetic plunger in an inoperative position, in which the disengagement lever does not act on the engagement lever when the built-in retractable flash is in the accommodation position. When the electromagnetic lunger is energized, the armature is released, so that the engagement lever is rotated into the disengagement direction to release the engagement. The electromagnetic plunger is secured to a support plate to which the engagement lever and the disengagement lever are secured, to form a single unit. The unit is secured to an immovable portion of the camera body by screws.

However, if the engagement lever, the disengagement lever, and the electromagnetic plunger are integrally formed as a unit, it is impossible to adjust a relative angle or position between the electromagnetic plunger and the disengagement lever. To this end, the electromagnetic plunger is not secured to the unit, so that the adjustment can be carried out, using a jig which holds the electromagnetic plunger as if the latter was secured to the unit. Namely, it is necessary to use the jig for the adjustment. Also, once the unit is mounted to the camera, no adjustment can be carried out.

Furthermore, since the two levers and the two springs are provided on the same shaft in the conventional built-in retractable flash, as mentioned above, the width of the flash (i.e., the axial direction of the shaft) is increased, so that a large space in the lateral direction of the camera is necessary for the built-in flash. Consequently, the width of the accommodation portion in which the light emitter and the support mechanism therefor are received is increased. Therefore, if an operation dial is provided aside the accommodation portion, the diameter of the dial or the distance between the dial and the accommodation portion is restricted.

SUMMARY OF THE INVENTION

It is an object of the present invention to provide a built-in retractable flash which can be easily assembled and adjusted and which has a sufficient strength.

Another object of the present invention is to provide a built-in retractable flash in which the width thereof can be reduced, so that an accommodation space in which the light emitter and the support mechanism are accommodated can be made small.

To achieve the object mentioned above, according to an aspect of the present invention, a built-in retractable flash of a camera is provided, including a light emitter which is supported on a camera body to be movable between a retracted position and a light emission position raised from the camera body; a lock lever mechanism having a lock lever which is movable between a lock position, wherein the lock lever engages with the light emitter to hold the light emitter in the retracted position, and an unlock position, wherein the lock lever allows the light emitter to move to the light emission position, the lock lever being biased toward the lock position; a base plate of the lock lever mechanism on which the lock lever is supported; an electromagnetic member provided on the base plate, the electromagnetic member being adapted to control the position of the lock lever between the lock position and the unlock position; a position adjustment mechanism for adjusting the position of the electromagnetic member on the base plate; and, a first and a second securing device for securing the base plate to the camera body; wherein the first securing device secures only the base plate to the camera body; and wherein the second securing device secures both the base plate and the electromagnetic member to the camera body after the relative position between the base plate and the electromagnetic member is adjusted by the position adjustment mechanism.

With this arrangement, the adjustment of the relative position and/or direction of the electromagnetic member and the lock lever mechanism can be facilitated and can be carried out even after the built-in flash is attached to the camera.

The position adjustment mechanism can be provided with a positioning pin and a positioning hole in which the positioning pin is fitted, which are formed on one and the other of the base plate and the electromagnetic member, wherein the electromagnetic member is rotatable with respect to the base plate about the center axis of the positioning pin.

The first securing device can be provided with a first positioning projection formed on the camera body; a first threaded hole formed in the first positioning projection; a first through hole formed on the base plate, in which the first positioning projection of the camera body can be inserted; and a first screw which is engaged with the threaded hole in the first through hole and secures the base plate to the positioning projection.

The second securing device can be provided with a second positioning projection formed on the camera body; a second threaded hole formed in the second positioning projection; a second through hole formed on the base plate, in which the second positioning projection of the camera body can be inserted; a third through hole formed on the electromagnetic member in which the second positioning projection of camera body can be inserted; a second screw which can be engaged with the second threaded hole through the second and third through holes and secures the electromagnetic member to the second positioning projection together with the base plate.

Preferably, the first and second positioning projections of the camera body are fitted into the first and second through holes of the base plate, respectively, so as to have a predetermined amount of slack in a direction perpendicular to the axes of the first and second screws, so that the position of the base plate is adjustable with respect to the camera body when the first and second screws are loosened.

Preferably, the camera body includes an outer plate secured to the camera body, the first and second positioning projections being formed on the inner surface of the outer plate.

In an embodiment, the lock lever mechanism further includes an unlocking lever which is supported on the base plate so as to be moved between a lock-allowing position, which allows the lock lever to be positioned in the lock position, and an unlocking-operation position, which moves the lock lever to the unlock position via the electromagnetic member; and a biasing member for biasing the unlocking lever to the unlocking-operation position, wherein a biasing force of the biasing member is stronger than a biasing force which biases the lock lever to the lock position.

In case that the lock lever mechanism is provided with the unlocking lever, it is preferable that the electromagnetic member includes an armature which is connected with the unlocking lever, a permanent magnet which attracts the armature, and a coil which produces a magnetic force which cancels the magnetic force of the permanent magnet when the coil is supplied with electricity. When the coil is not supplied with electricity, the armature is attracted by the permanent magnet so that the unlocking lever is held in the lock-allowing position wherein the lock lever is held in the lock position. When the coil is supplied with electricity, the unlocking lever is moved to the unlocking-operation position by the biasing force of the biasing member so that the armature is engaged with the lock lever and moves the lock lever to the unlock position.

According to another aspect of the present invention, a built-in retractable flash of a camera is provided, including a light emitter which is supported on a camera body to be movable between a retracted position and a light emission position raised from the camera body; a lock lever which is rotatable between a lock position, wherein the lock lever engages with the light emitter to hold the light emitter in the retracted position, and an unlock position, wherein the lock lever allows the light emitter to move to the light emission position, the lock lever being biased toward the lock position; a first biasing member for biasing the lock lever to the lock position; an unlocking lever which is rotatable between a lock-allowing position, which allows the lock lever to rotate to the lock position, and an unlocking-operation position, which rotates the lock lever to the unlock position a second biasing member for biasing the unlocking lever to the unlocking-operation position; a biasing force of the second biasing member being stronger than a biasing force of the first biasing member; and a base plate on which the lock lever and the unlocking lever are rotatably supported; an electromagnetic member which holds the unlocking lever in the lock-allowing position against the biasing force of the second biasing member. The electromagnetic member is secured to the camera body together with the base plate via a common securing screw.

In this built-in retractable flash, it is preferable that the base plate is provided with a positioning pin which can be fitted in a positioning hole formed in the electromagnetic member.

In an embodiment, the base plate is secured to a projection formed on the camera body together with the electromagnetic member via the common securing screw.

Preferably, the built-in retractable flash further includes a base plate securing projection formed on the camera body; and a base plate securing screw. The base plate securing screw secures only the base plate to the base plate securing projection of the camera body and the common securing screw secures both the base plate and the electromagnetic member to the projection (which differs from the base plate securing projection).

Preferably, the electromagnetic member includes an armature which is connected with the unlocking lever, a permanent magnet which attracts the armature, and a coil which produces a magnetic force which cancels the magnetic force of the permanent magnet when the coil is supplied with an electricity. The unlocking lever is held in the lock-allowing position when the armature is attracted by the permanent magnet so that the lock lever is positioned in the lock position by biasing force of the first biasing member. The unlocking lever is rotated to the unlocking-operation position by the biasing force of the second biasing member when the attracting force of the permanent magnet is canceled by the magnetic force of the coil, so that the lock lever rotates to the unlock position.

According to another aspect of the present invention, a built-in retractable flash of a camera is provided, including a light emitter which is supported on a camera body to be movable between a retracted position and a light emission position raised from the camera body; a lock lever which is rotatable between a lock position, wherein the lock lever engages with the light emitter so as to lock the light emitter in the retracted position, and an unlock position, wherein the lock lever disengages with the light emitter in order to allow the light emitter to move the light emission position; a first biasing member for biasing the lock lever to the lock position; an unlocking lever which is rotatable between a lock-allowing position, which allows the lock lever to be positioned in the lock position, and an unlocking-operation position, wherein the lock lever rotates to the unlock position; a second biasing member for biasing the unlocking lever to the unlocking-operation position, wherein a biasing force of the second biasing member is stronger than a biasing force of the first biasing member; first and second rotational shafts which rotatably support the lock lever and the unlocking lever respectively; and an electromagnetic member which holds the unlocking lever in the lock-allowing position when electricity is not supplied to the electromagnetic member, and releases the unlocking lever so as to rotate to the unlocking-operation position when electricity is supplied to the electromagnetic member. The first and second rotation shafts extend in parallel in a direction of the axes thereof, and are spaced from one another in a direction perpendicular to the axes.

With this structure, since the lock lever and the unlocking lever are not coaxial, the lateral width of the built-in flash can be reduced.

Preferably, the first rotation shaft of the lock lever and the second rotation shaft of the unlocking lever are spaced from one another in the forward and rearward direction of the camera body.

Preferably, the first biasing member is a torsion coiled spring which is wound about the first rotation shaft, and wherein the second biasing member is a torsion-coiled spring which is wound about the second rotation shaft.

The electromagnetic member can be provided with an armature which is connected with the unlocking lever, a permanent magnet which attracts the armature, and a coil which produces a magnetic force which cancels the magnetic force of the permanent magnet when the coil is supplied with electricity. When the coil is not supplied with electricity, the armature is attracted by the permanent magnet, and the unlocking lever is held in the lock-allowing position so that the lock lever is held in the lock position. When the coil is supplied with electricity, the unlocking lever is moved to the unlocking-operation position by biasing force of the second biasing member so that the armature is engaged with the lock lever and moves the lock lever to the unlock position.

Preferably, the built-in retractable flash further includes a charge member which compresses the second biasing member to thereby increase the elastic biasing force when the light emitter is in the retracted position, and which allows the second biasing member to expand to thereby allow the armature to be attracted by the permanent magnet when the light emitter is moved in the direction toward the light emission position.

Preferably, the built-in retractable flash further includes a third biasing member for biasing the light emitter to the light emission position.

Preferably, the camera is a single lens reflex camera and the light emitter is provided on a pentagonal roof of the single lens reflex camera.

Preferably, the first and second rotational shafts are provided on a common base plate.

The present disclosure relates to subject matter contained in Japanese Patent Applications Nos. 11-179748 (filed on Jun. 25, 1999) and 11-179749 (filed on Jun. 25, 1999) which are expressly incorporated herein by reference in their entireties.

BRIEF DESCRIPTION OF THE DRAWINGS

The invention will be discussed below in detail with reference to the drawings, in which.

DESCRIPTION OF THE PREFERRED EMBODIMENTS

Figure 1:
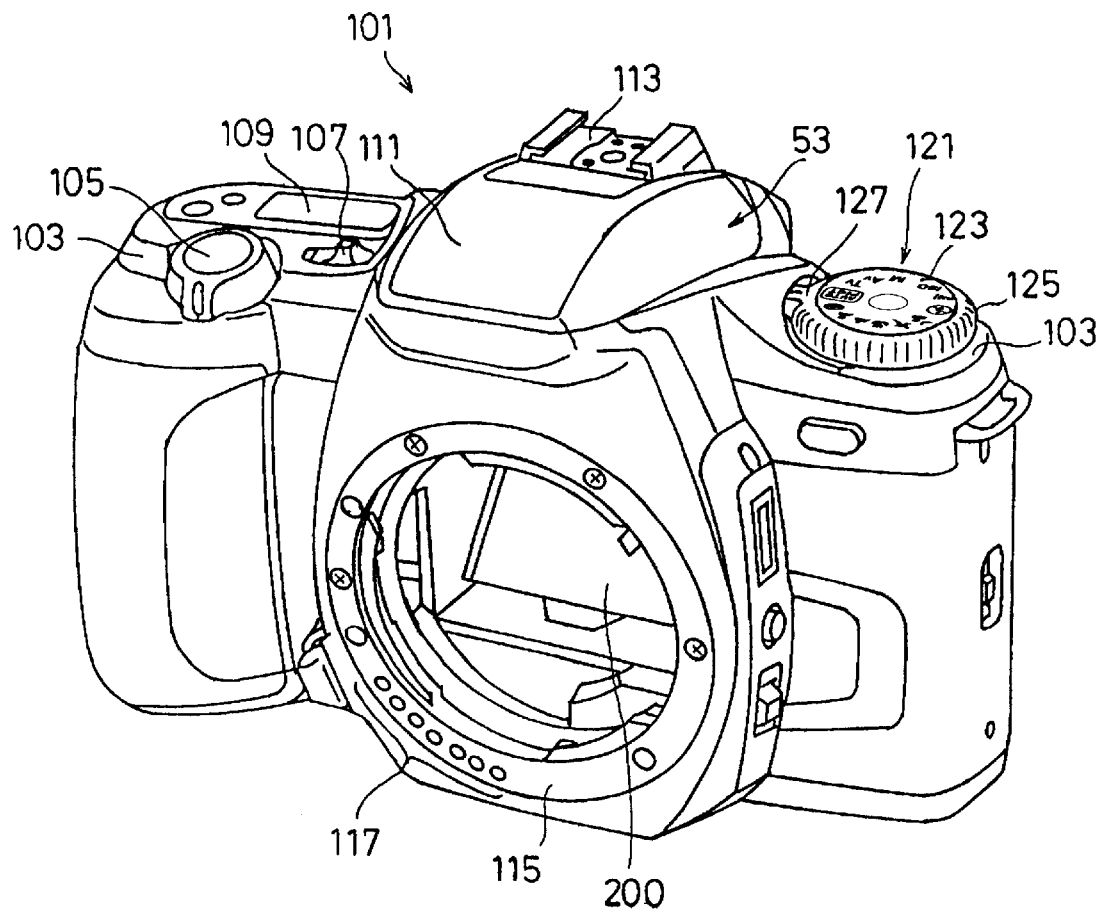
FIG. 1 is a perspective view of an embodiment of a camera body of a single lens reflex camera having a built-in flash according to the present invention.
Figure 2:
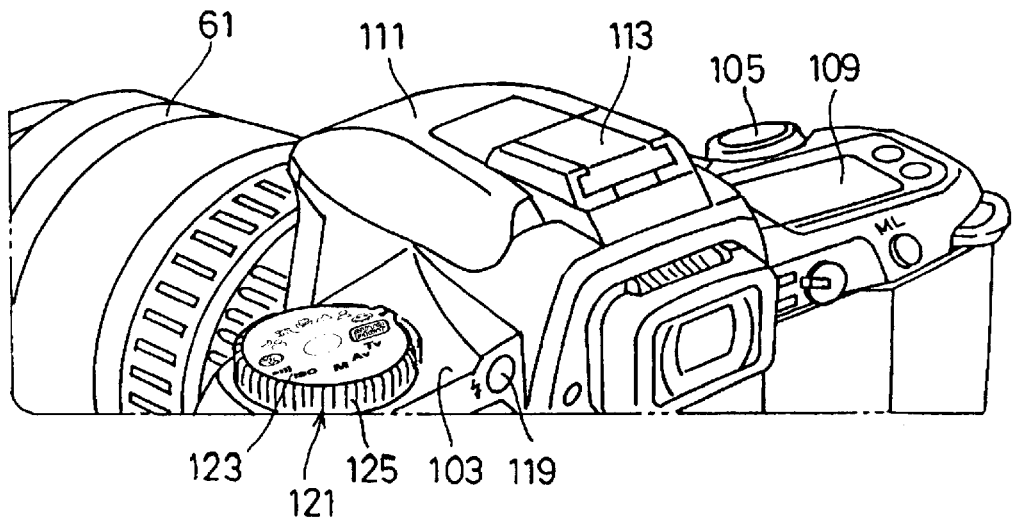
FIG. 2 is a rear perspective view of a main part of a single lens reflex camera having a built-in flash in a retracted position.
Figure 3:
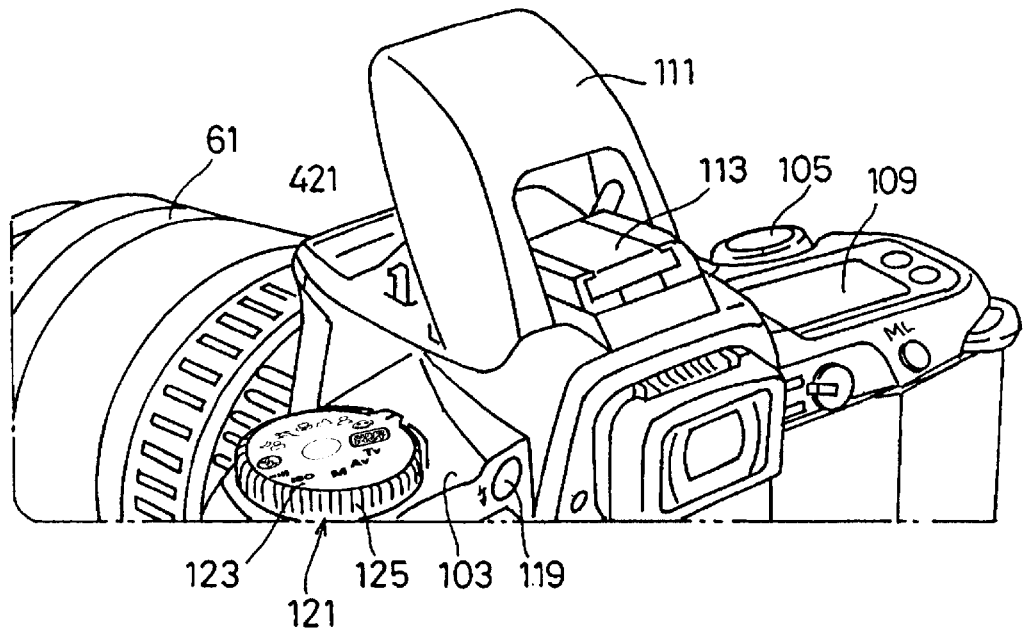
FIG. 3 is a rear perspective view of a main part of a single lens reflex camera having a built-in flash in a pop up position.

FIG. 1 shows a perspective view of a camera body of an AF (Auto-Focus) single lens reflex camera, FIG. 2 shows a rear perspective view of a main part of a single lens reflex camera, and FIG. 3 shows a rear perspective view of a built-in flash for a single lens reflex camera in a pop-up position.

An upper decorative plate (outer plate) 103 of a camera body 101 is provided with a release button 105 on the left side, a main switch button 107 behind the release button, an external LCD 109 in which the number of exposed frames of a film, the shutter speed, the aperture value, etc. are indicated, a light emitter 111 for a built-in flash 53 (refer to FIGS. 1 and 5) provided in the center pentagonal roof portion, and an accessory shoe 113 behind the light emitter 111.

Figure 6:
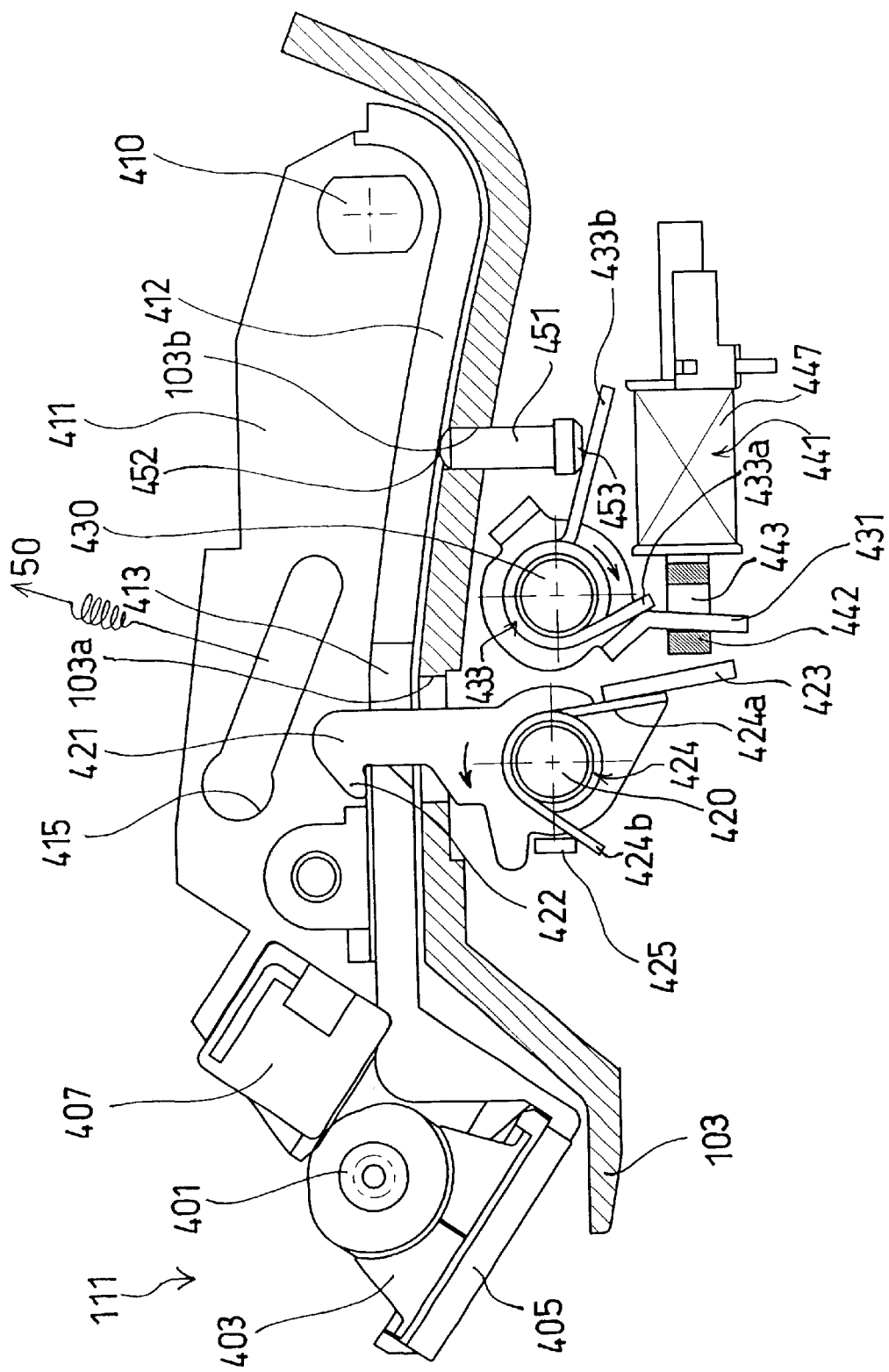
FIG. 6 is a partially sectioned side view of a built-in flash of a single lens reflex camera, with an outer frame of a light emitter removed, in a retracted position.

The light emitter 111 has a light emitter housing which is provided therein with a xenon tube 401, a reflector 403, and a Fresnel lens 405 and which is supported on a pentagonal roof by a pop-up mechanism, as shown in FIG. 6. The light emitter is moved by the pop-up mechanism between a retracted position shown in FIGS. 1 and 2 and a pop-up position (light emission position) shown in FIG. 3 in which the light emitting surface above the pentagonal roof faces an object to be taken.

As shown in FIG. 6, the built-in flash includes a pop-up spring (third biasing member) 50 which continuously biases the light emitter 111 into the pop-up position, and an engagement lever (lock lever) 421 which engages the light emitter 111 in the retracted position against the spring force of the pop-up spring 50 when the light emitter 111 is moved to the retracted position. The engagement lever 421 engages with an engagement portion of the light emitter 111 to lock the light emitter 111 in the retracted position when the light emitter 111 is manually moved by a user to the retracted position. The engagement of the engagement lever 421 is released when a pop-up magnet PuMg (FIG. 4) is supplied with electricity, so that the light emitter 111 is popped-up (moved) to the pop-up position by the spring force of the pop-up spring 50.

A compulsory light emission button 119 is provided on the rear surface of the camera body 101 to actuate the pop-up magnet PuMg to thereby pop up the light emitter 111.

A mode dial 121 is provided on the right side portion of the upper decorative plate 103 to select a program mode from a plurality of exposure modes. Provided on the front surface of the camera body 101 are a body mount 115 to which a photographing lens 61 is amounted, and a group of body contacts 117 which are electrically connected to a lens CPU 63 of the photographing lens 61 mounted to the camera body to perform data-communication with the lens CPU in order to input lens information, such as an open aperture or focal length, etc.

The mode dial 121 is provided with a mode disc (indication plate) 123, secured to the upper decorative plate 103, in which characters, letters or figures, etc., are indicated, and a bezel 125 which is rotatably attached to the outer peripheral surface of the mode disc 123. The bezel 125 is provided with an indicia 127 which corresponds to one of a group of letters or figures (characters) indicated on the mode disc 123 in accordance with the rotation of the mode dial, so that a mode represented by the corresponding letter or figure can be selected.

Figure 4:
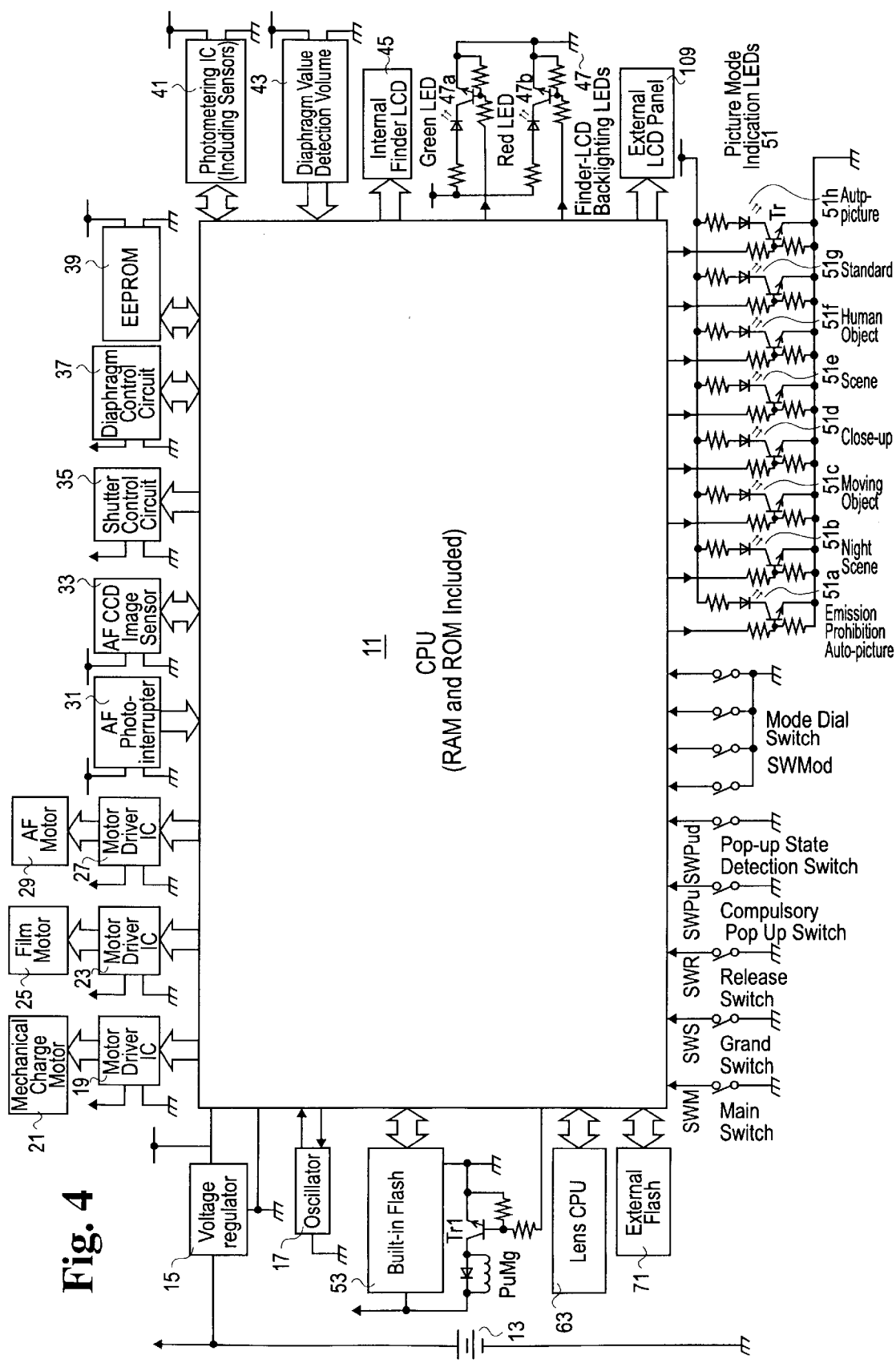
FIG. 4 is a block diagram of a circuit of a control system in a single lens reflex camera, by way of example.
Figure 5:
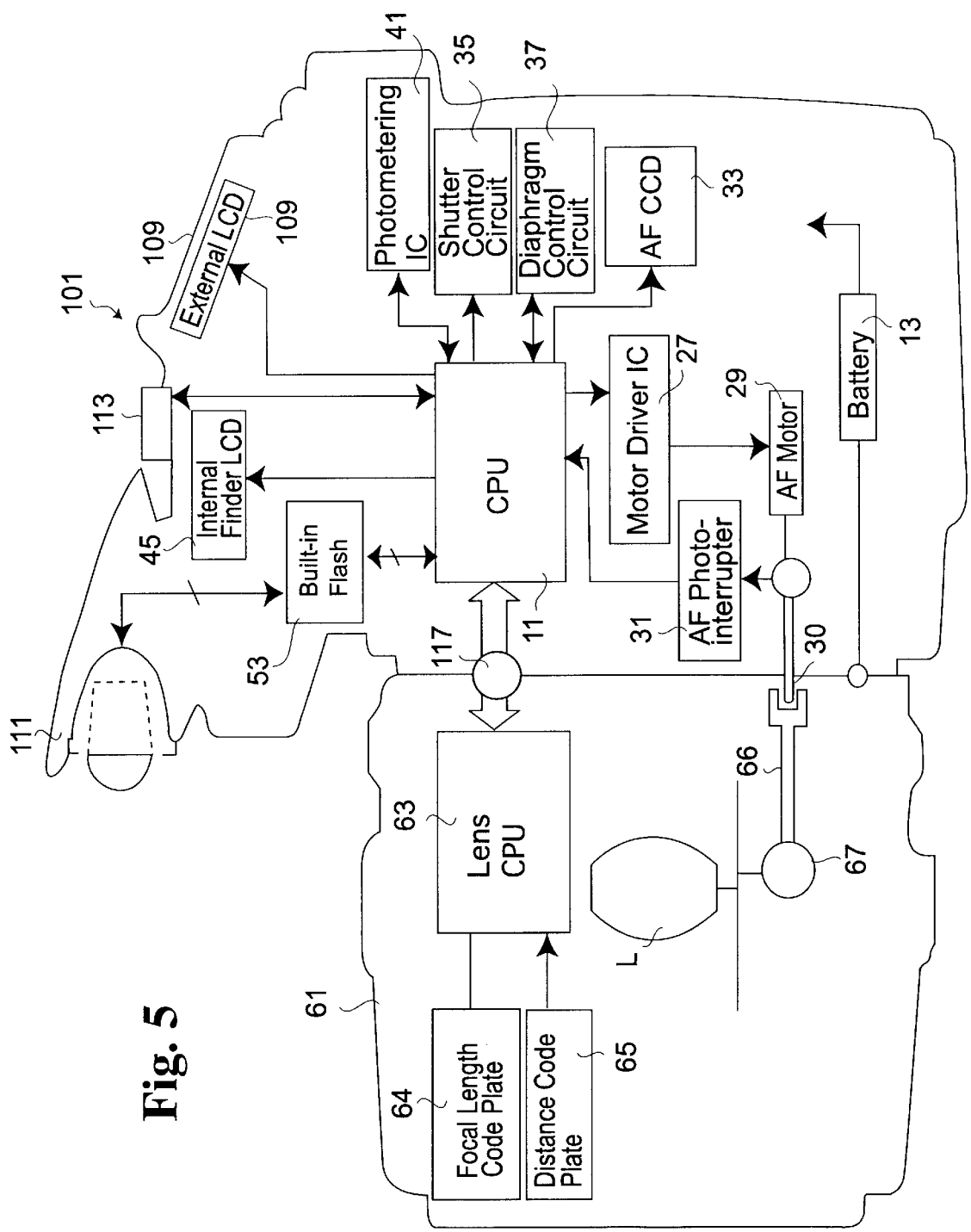
FIG. 5 is a schematic view of main components of a single lens reflex camera to which a photographing lens is attached.

The control system of the camera body 101 will be discussed below with reference to the block diagrams shown in FIGS. 4 and 5. The camera body 101 includes a CPU 11 which generally controls the camera operation. The CPU 11 is provided therein with a ROM in which programs of the camera functions, etc., are stored, and a RAM in which various parameters and lens information, etc., are temporarily stored. An EEPROM 39 is connected to the CPU 11 to record the number of exposed frames of a film, and rewritable parameters or modes. A constant voltage is supplied to the CPU 11 from a battery 13 loaded in a battery compartment (not shown) of the camera body 101 through a voltage regulator 15. The CPU 11 operates an oscillator 17 by the constant voltage supplied through the voltage regulator 15, so that the CPU operates in synchronization with clock pulses output from the oscillator 17.

The CPU 11 is connected to a main switch SWM, a photometering switch SWS, a release switch SWR, a compulsory pop-up switch SWPu, a pop-up state detection switch SWPud, and a mode dial switch SWMod which operates in association with the rotation of the bezel 125.

The main switch SWM is associated with the main switch button 107. When the main switch SWM associated with the main switch button 107 is turned ON, the CPU 11 operates. Consequently, the CPU 11 supplies the peripherals with electricity and performs an operation corresponding to the depressed switch.

The photometering switch SWS and the release switch SWR are associated with the release button 105 and are turned ON when the release button 105 is depressed by a half step and by a full step, respectively. When the photometering switch SWS is turned ON, the CPU 11 calculates the brightness of the object based on the brightness signal input thereto from a photometering IC 41; performs an AE calculation to obtain optimum shutter speed and aperture value at the selected exposure mode; calculates the defocus amount based on the video signal of the object image input thereto from a phase-difference type AF CCD 33; and drives an AF motor 29 through a motor driver IC 27 to move the focusing lens group L of the photographing lens 61 to the focal position in order to perform the AF operation. The rotation of the AF motor 29 is transmitted to a joint 66 of the photographing lens 61 through a joint 30, so that a focus adjustment mechanism 67 is driven through the joint 66 to move the focusing lens group L to the focal position. The displacement of the focusing lens group L is determined based on the number of pulses of an AF photo-interrupter 31 which outputs AF pulses in association with the rotation of the AF motor 29. The amount of drive of the AF motor 29 is controlled based on the number of the AF pulses output from the AF photo-interrupter interrupter 31. Note that the photometering IC 41 is provided with a split-type photometering sensors which can detect the brightness for each of the split photometering areas.

When the release switch SWR is turned ON, the CPU 11 controls a quick-return mirror 200 (shown in FIG. 1) to move up, operates a diaphragm control circuit 37 based on the aperture value set by the AE calculation to reduce the stop of the photographing lens 61, and operates a shutter control circuit 35 based on the shutter speed to carry out the exposure operation. Upon completion of an exposure, a mechanical charging motor 21 is actuated through a motor driver IC 19 to move the quick-return mirror downwards and charge the springs for biasing leading and trailing curtains of the shutter mechanism. The CPU 11 operates a film motor 25 via a motor driver IC 23 to wind the film by one frame.

The compulsory pop-up switch SWPu is turned ON when the compulsory emission button 119 is depressed. When the compulsory pop-up switch SWPu is turned ON, the CPU 11 turns a switching transistor Tr1 ON to supply the pop-up magnet PuMg with electricity to thereby disengage the light emitter 111 from the engagement lever 421. Consequently, the light emitter 111 is popped up to the pop-up position (light emission position) by the spring force of the pop-up spring 50. The CPU 11 detects, through the pop-up state detection switch SWPud which is turned ON when the light emitter 111 is moved to the pop-up position, that the light emitter 111 is popped up to the pop-up position. The pop-up state detection switch SWPud is turned OFF when the light emitter 111 is moved from the pop-up position toward the retracted position.

In the illustrated embodiment, if it is judged based on the brightness data of the object obtained from the photometering IC 41 and the ISO film speed data, etc., that the object brightness is low, the pop-up magnet PuMg is energized to pop up the light emitter 111, so that the flash can be automatically emitted. Note that when an external flash 71 is attached to the accessory shoe 113, the emission of the external flash 71 is controlled in the same way as the built-in flash 53 without popping-up the light emitter 111, because if the light emitter 111 is popped up, it is possible that the light emitter 111 interferes with the external flash 71.

The mode dial switch SWMod is a 4-bit code switch which is turned ON/OFF in accordance with the angular stop position of the bezel 125. The CPU 11 selects, based on the ON/OFF combination, the mode, function or parameter corresponding to the angular stop position of the bezel 125, i.e., the character, figure or letter indicated on the mode disc 123, indicated (pointed) by the indicia 127 of the bezel 125.

The mode dial 121 is provided with a picture mode indication LED 51 (51a through 51h) as an illumination means for illuminating a corresponding character, figure or letter of the mode disc 123. The transistors Tr are connected to the CPU 11 to independently drive the picture mode indication LEDs 51a through 51h. In the illustrated embodiment, when the main switch SWM is turned ON or a program mode is selected by the bezel 125, the corresponding transistors Tr are turned ON to light the corresponding picture mode indication LEDs 51a through 51h, so that the selected mode can be indicated.

The external LCD 109 and an internal finder LCD 45 are connected, as an indication device for indicating the photographing information, to the CPU 11. When the main switch SWM associated with the main switch button 107 is OFF, the CPU 11 does not indicate anything in the internal finder LCD 45, and indicates information needed prior to the photographing operation in the external LCD 109. The information needed prior to the photographing operation refers to, for example, whether or not the film is loaded, the absence or presence of the film, whether or not the film is correctly wound up, the film loading state, the number of the exposed frames if the film has been correctly wound up, the rewind state of the film when the film is being rewound, and the completion of the rewinding operation, etc.

When the main switch SWM is turned ON, the number of the exposed frames, the selected shutter speed, the selected mode, etc., are indicated in the external LCD 109, and nothing is indicated in the internal finder LCD 45 when the photometering switch SWS is depressed by a half step or until the mode dial 121 is actuated and the AE calculation is carried out. Upon completion of the AE calculation, useful photographing information, such as the calculated optimum shutter speed and aperture value, etc., is indicated in the external LCD 109 and the internal finder LCD 45.

The internal finder LCD 45 is provided with a back-light 47 having a green LED 47a and a red LED 47b, as an illumination device for illuminating the information indicated in the liquid crystal panel thereof. The CPU 11 turns ON the green LED 47a in the normal photographing state and turns ON the red LED 47b to warn the user of, for example, the fact that the shutter speed is smaller than the camera-movement limit speed. Thus, the change in the color of the illumination light calls the attention of a user.

If the photographing lens 61 having the lens CPU 63 is attached to the camera body 101, the CPU 11 communicates with the lens CPU 63 and receives lens data, such as the focal length, the current focal length in the case that the photographing lens is a zoom lens, the object distance (position of the focusing lens group L), and the open aperture, etc. The lens CPU 63 detects the focal length through a focal length detection code plate 64, detects the object distance (position of the focusing lens group L) through a distance code plate 65, and communicates with the CPU 11 of the camera body 101.

The built-in flash of the camera body 101 constructed as above will be discussed below in detail, with reference to FIGS. 6 through 14. FIGS. 6 through 10 and FIGS. 13 and 14 show partial sectional views of the light emitter 111 with an outer frame removed.

The light emitter 111 includes the xenon tube 401, the reflector 403, the Fresnel lens 405, and the trigger coil 407. These elements are supported between the front ends of a pair of support arms 411. The support arms 411 are rotatably supported at the rear ends by a bearing plate 165 (FIG. 12) which is formed integral with the upper decorative plate 103 of the camera body 101, through the pop-up rotation shaft 410. The support arms are continuously biased toward the pop-up position (light emission position) by a pop-up linkage in which cam pins (not shown) are fitted in cam grooves 415. The pop-up linkage continuously biases the support arms 411 in the pop-up direction by the pop-up spring 50. Each of the support arms 411 has a substantially L-shape in cross section and a flange 412 of the support arm 411 is provided with an engagement hole 413 in which an engagement hook 422 of the engagement lever 421 can enter. The flange 412 and the portion of the upper decorative plate 103 that defines the accommodation portion are shaped so that they substantially fit into each other in the retracted state.

A lock apparatus for locking (and unlocking) the light emitter 111 at the retracted position is provided in the camera body 101 and under the upper decorative plate 103. The lock apparatus of the built-in flash includes a lock lever mechanism having the engagement lever (lock lever 421 and a disengagement lever (unlocking lever) 431, and an electromagnetic plunger 441 (electromagnetic member).

The engagement lever 421 is rotatably supported by a base plate 461 of the lock lever mechanism (FIG. 11) via an engagement lever shaft (first rotation shaft) 420. The engagement hook 422 projects from the engagement lever hole 103a formed in the upper decorative plate 103. An engagement spring (first biasing member) 424 is wound about the engagement lever shaft 420 to bias the engagement lever 421 in a direction to engage the engagement hook 422 with the edge of the engagement hole 413 (i.e., counter clockwise direction of FIG. 6). The engagement spring 424 is a torsion-coiled spring and abuts at one end 424a thereof against an abutment portion 423 provided on the side opposite the engagement hook 422 with respect to the engagement lever shaft 420. The other end 424b of the engagement spring 424 abuts against an engagement portion 425 formed in the base plate 461. The base plate 461 is secured to the upper decorative plate 103 by screws.

The electromagnetic plunger 441 having the Pop-up magnet PuMg is mounted to the base plate 461 of the lock lever mechanism in the vicinity of the abutment portion 423, so that it is possible for an armature 442 thereof to press at the front end thereof against the abutment portion 423. The electromagnetic plunger 441 is provided with a permanent magnet 447 which normally attracts the armature 442 in a retracted position. When the pop-up magnet PuMg is energized, the magnetic force of the permanent magnet 447 is canceled, so that the armature 442 is free to project. Note that the pop-up magnet PuMg includes a coil which generates the magnetic force in order to cancel out the magnetic force of the permanent magnet 447, when the coil is supplied with electricity.

The armature 442 is provided on its projecting end with a groove 443 in which the front end of the disengagement lever 431 is loosely fitted. The disengagement lever 431 is rotatably supported by the base plate 461 via a disengagement lever shaft (second rotation shaft) 430. The disengagement lever shaft 430 which supports the disengagement lever 431 and a disengagement spring (biasing member/second biasing member) 433, and the engagement lever shaft 420 which supports the engagement lever 421 and the engagement spring 424 extend in parallel with respect to each other, and are spaced from one another in the forward and rearward direction of the camera (camera body 101).

The disengagement spring 433 is wound about the disengagement lever shaft 430 to bias and rotate the disengagement lever 431 toward the abutment portion 423. The disengagement spring 433 is a torsion-coiled spring which abuts at its one end 433a against the disengagement lever 431 and at the other end 433b against a charge pin (charge member) 451. The charge pin 451 is provided on the rear end thereof with a large diameter head 453 and protrudes at the front end 452 thereof outward from the charge pin hole 103b formed in the upper decorative plate 103. The head 453 is located within the camera body to prevent the charge pin from slipping off from the camera body. When the light emitter 111 is in the retracted position, the end 433b of the disengagement spring 433 is pressed (charged) by the head 453 of the charge pin 451, so that the disengagement spring 433 is compressed (charged) and the elastic biasing force is increased. Namely, a strong biasing force to rotate the disengagement lever 431 in the disengagement direction is given to the end 433a of the disengagement lever 433. The disengagement direction refers to the clockwise direction in FIG. 6, i.e., a direction to project the armature 442, or a direction to rotate the engagement lever 421 in the disengagement direction.

The lock and unlock operation, the pop-up operation, the retraction operation, of the built-in flash will be explained below, with reference to FIGS. 6 through 10.

In the retracted position shown in FIG. 6, the engagement hook 422 engages with the edge of the engagement hole 413 to lock the light emitter 111 in the retracted position. Namely, the engagement lever 421 is in a lock position in FIG. 6. In the retracted position of FIG.6, the disengagement lever 431 is held in a lock-allowing position in which allows the engagement lever 421 to be positioned in the lock position, via the magnetic force of the permanent magnet 447.

Figure 7:
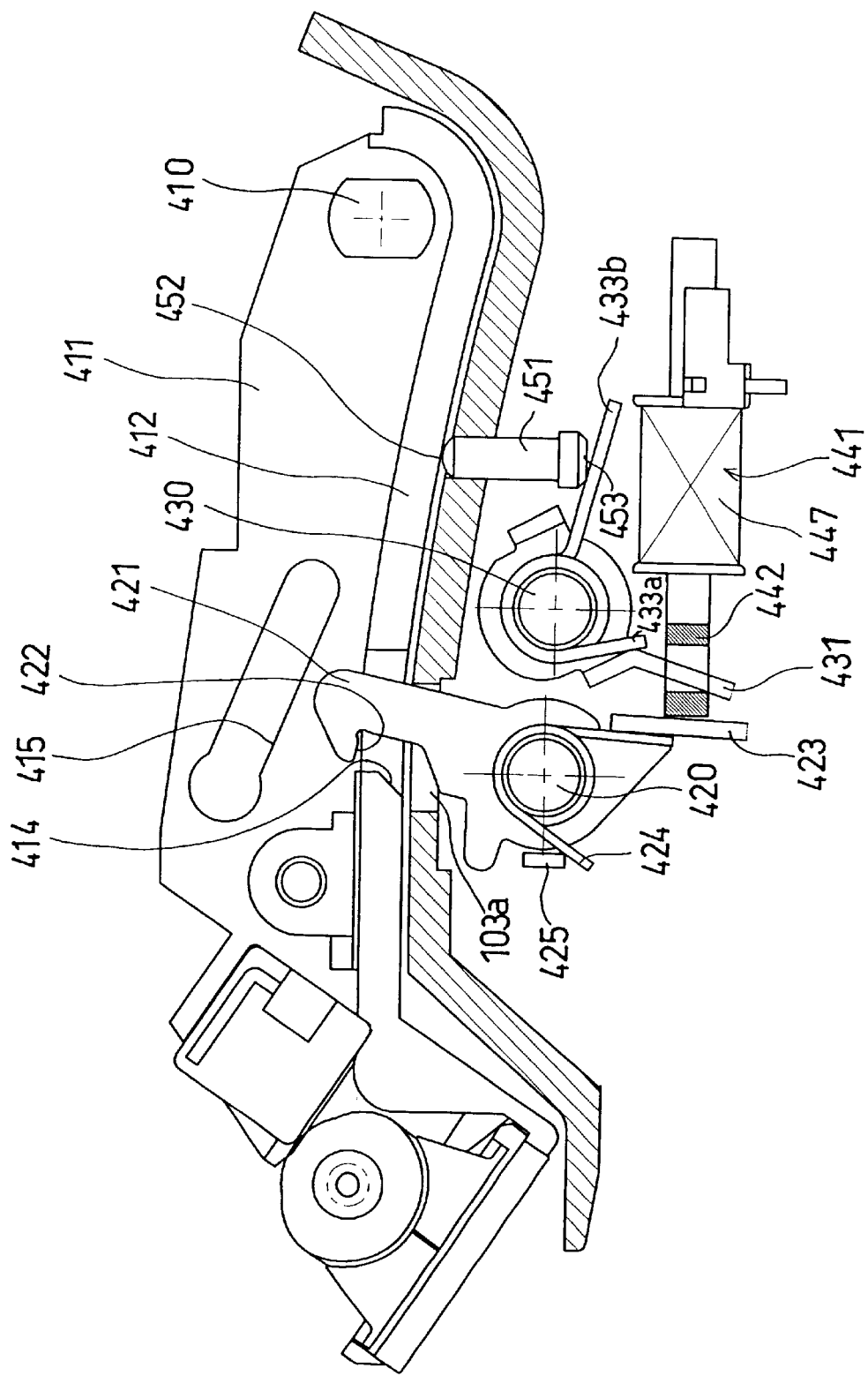
FIG. 7 is a partially sectioned side view of a built-in flash of a single lens reflex camera, with an outer frame of a light emitter removed, in a retracted position when the engagement is released.

In the retracted position, when the pop-up magnet PuMG is supplied with electricity, the magnetic force of the permanent magnet 447 which attracts the armature 442 is canceled by the magnetic force produced by the coil of the pop-up magnet PuMg, so that the armature is free to project. Thus, the armature 442 is projected by the disengagement lever 431 which is biased to rotate by the disengagement spring 433 (FIG. 7). Consequently, the projected armature 442 abuts against the abutment portion 423 and rotates the engagement lever 421 in the disengagement direction (clockwise direction in FIGS. 6 and 7) against the biasing force of the engagement spring 424.

The rotation of the engagement lever 421 in the disengagement direction causes the engagement hook 422 to be disengaged from the edge of the engagement hole 413, so that the support arms 411 can be rotated (popped-up) by the biasing force of the pop-up spring 50. Namely, the engagement lever 421 is rotated from the lock position (FIG. 6) to a unlock position (FIG. 7) which allows the light emitter 111 to pop-up. Similarly, the disengagement lever 431 is rotated form the lock-allowing position (FIG. 6) to a unlocking-operation position (FIG. 7) in which rotates the engagement lever 421 to the unlock position, via the biasing force of the disengagement spring 433.

Figure 8:
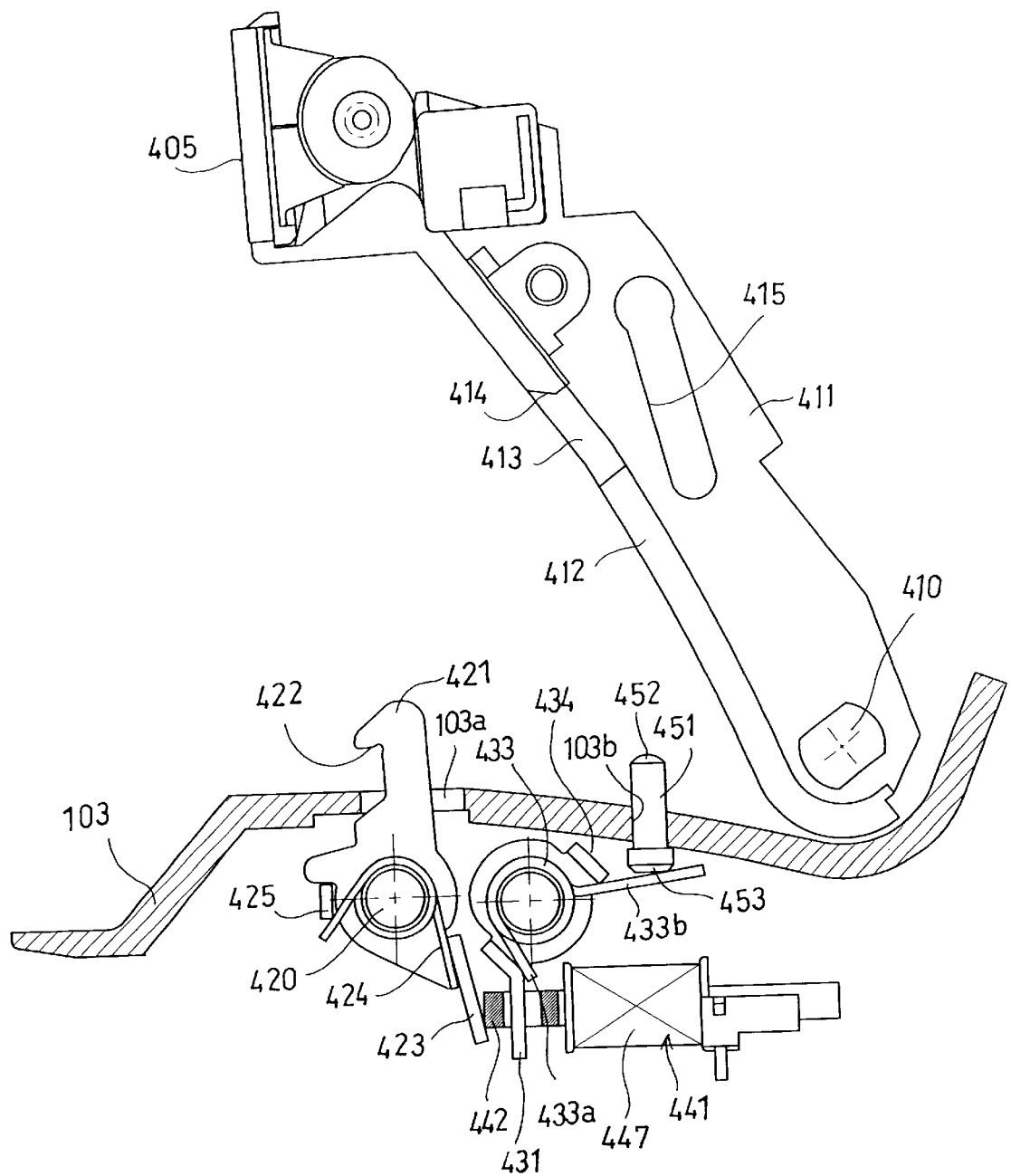
FIG. 8 is a partially sectioned side view of a built-in flash of a single lens reflex camera, with an outer frame of a light emitter removed, in a pop-up position.

When the engagement by the engagement lever 421 is released, the support arms 411 are popped-up (rotated) by the biasing force of the pop-up spring 50 and are stopped at the light emission position, as shown in FIG. 8. In this position, the flange portion 412 is moved away from the front end 452 of the charge pin 451, and hence the charge pin 451 is free. Consequently, the end 433b of the disengagement spring 433 abuts against the engagement portion 434 of the disengagement lever 431, so that the biasing force of the disengagement spring 433 to bias the disengagement lever 431 in the disengagement direction disappears or reduces, i.e, the disengagement spring 433 expands. Namely, in the pop-up position, the disengagement lever 431 is no longer effective, so that the armature 442 is free, and the sum of at least the magnetic force of the permanent magnet 447 to attract the armature 442 and the spring force of the engagement spring 424 to rotate the abutment portion 423 in the engagement direction (i.e., to retract the armature 442) is stronger than the biasing force of the disengagement spring 433 in the direction to project the armature 442. Therefore, the armature 442 is moved into the electromagnetic plunger 441 by the abutment portion 423 and is attracted by the permanent magnet 447.

In the pop-up position shown in FIG. 8, the support arms 411 are held in a restriction position in which they are pressed against rotation restriction members (not shown) which restrict the rotation thereof from the retracted position to the pop-up position, rotated by the biasing force of the pop-up spring 50. The pop-up state detection switch SWPud is turned ON when the light emitter 111 is in the pop-up position.

Figure 9:
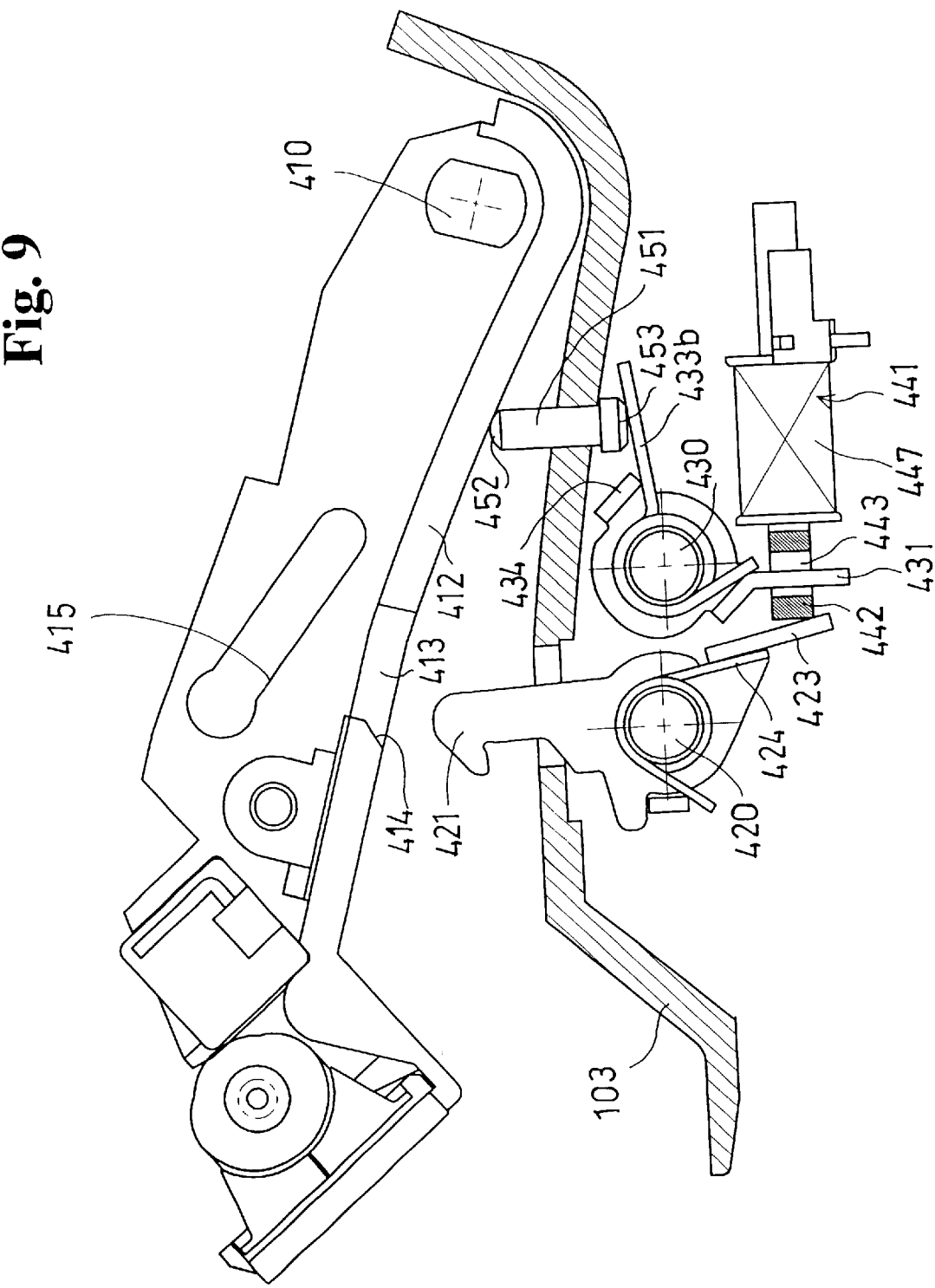
FIG. 9 is a partially sectioned side view of a built-in flash of a single lens reflex camera, with an outer frame of a light emitter removed, in an intermediate position between the pop-up position and the retracted position.

When the light emitter 111 is rotated toward the retracted position from the pop-up position, the flange portion 412 abuts against the front end 452 of the charge pin 451 to retract the charge pin. Consequently, the head 453 of the charge pin 451 presses the second end 433b of the disengagement spring 433 in the charge direction to thereby charge the disengagement spring 433 (FIG. 9).

Figure 10:
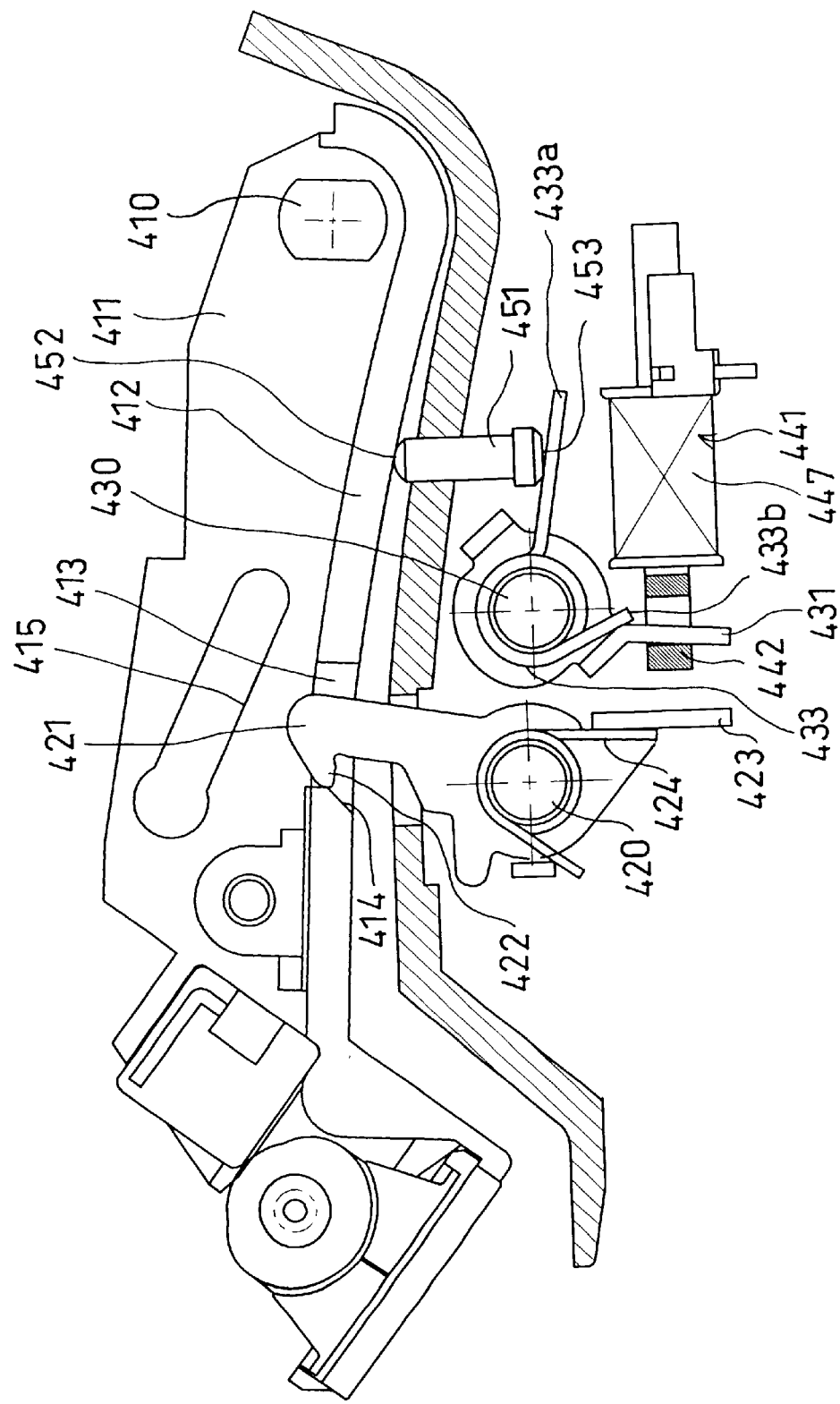
FIG. 10 is a partially sectioned side view of a built-in flash of a single lens reflex camera, with an outer frame of a light emitter removed, in the vicinity of a retracted position to show an engagement of an engagement lever.

A further rotation of the light emitter 111 toward the retracted position causes an inclined surface 414, which defines the engagement hole 413, to be brought into sliding contact with the inclined surface of the engagement hook 422, so that the engagement lever 421 is rotated in the disengagement direction (clockwise direction of FIG. 9) against the spring force of the engagement spring 424 (FIG. 10). When the light emitter 111 reaches the retracted position, or is further moved beyond the retracted position, the inclined surface 414 rides over the inclined surface of the engagement hook 422, so that the engagement lever 421 is rotated, by the biasing force of the engagement spring 424, to the lock position in which the engagement hook 422 engages with the peripheral edge of the engagement hole 413 to lock the light emitter 111 in the retracted position (FIG. 6). Note that when the light emitter 111 is rotated from the pop-up position to the retracted position, the pop-up state detection switch SWPud is turned OFF.

The assembly of the above-described lock apparatus, i.e., the assembly of the engagement lever 421, the disengagement lever 431 and the electromagnetic plunger 441 to the camera, will be explained below with reference to FIGS. 11 through 14.

Figure 11:
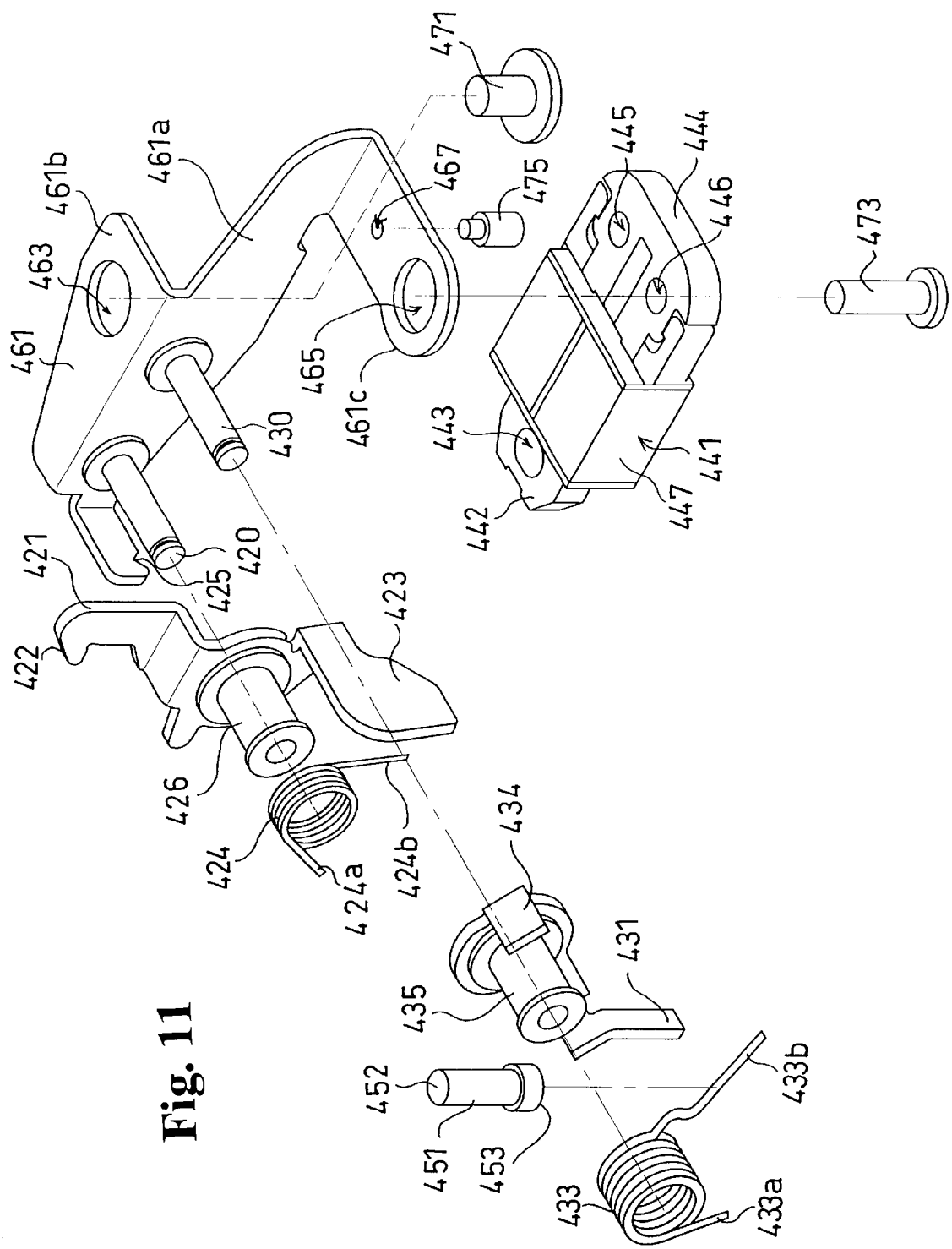
FIG. 11 is an exploded perspective view of a lock apparatus of a built-in flash of a single lens reflex camera, according to an embodiment of the invention.
Figure 12:
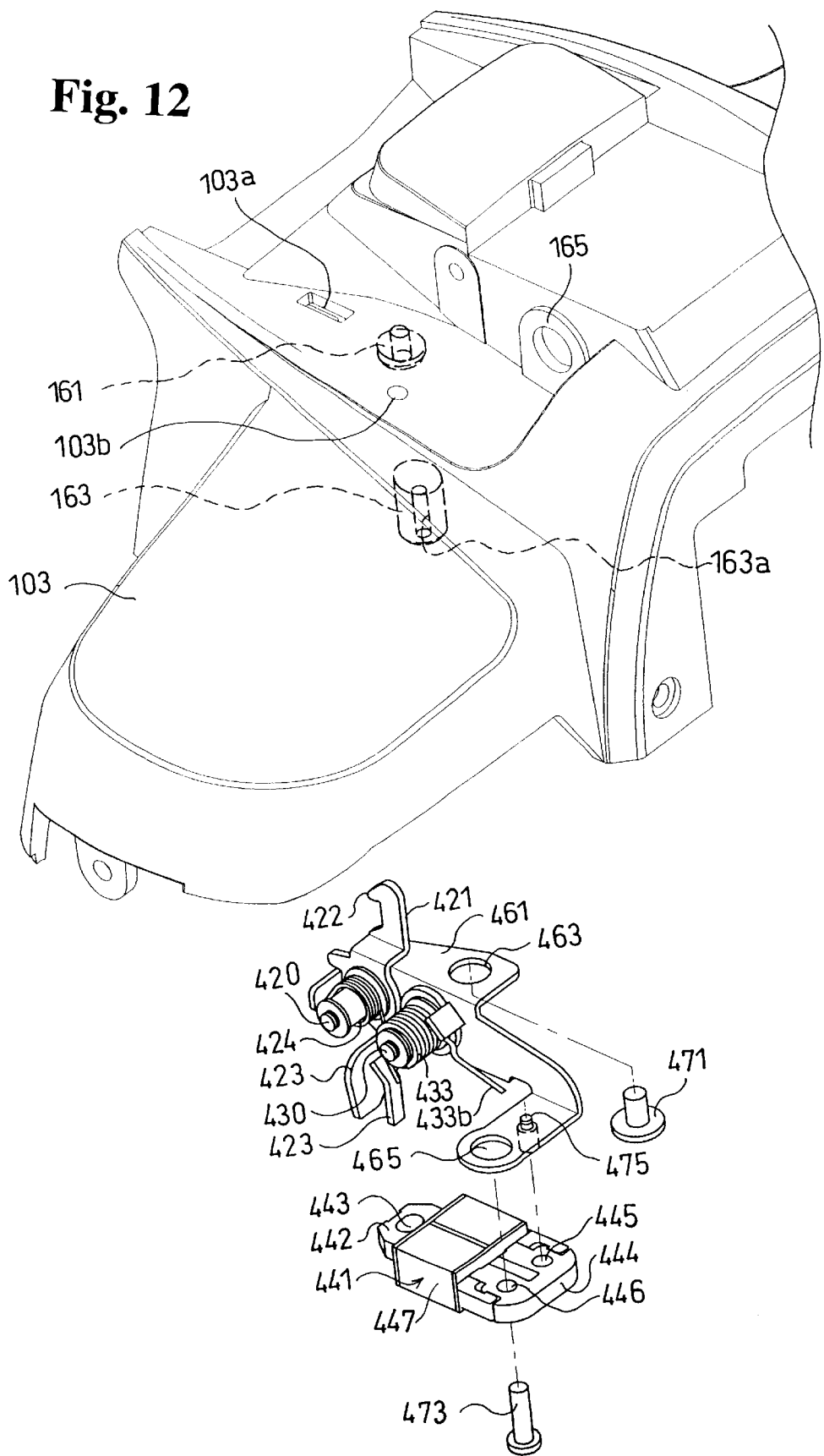
FIG. 12 is a perspective view of a lock apparatus for a built-in flash and an upper decorative plate of a camera body to which the lock apparatus is to be attached before the lock apparatus is attached.
Figure 13:
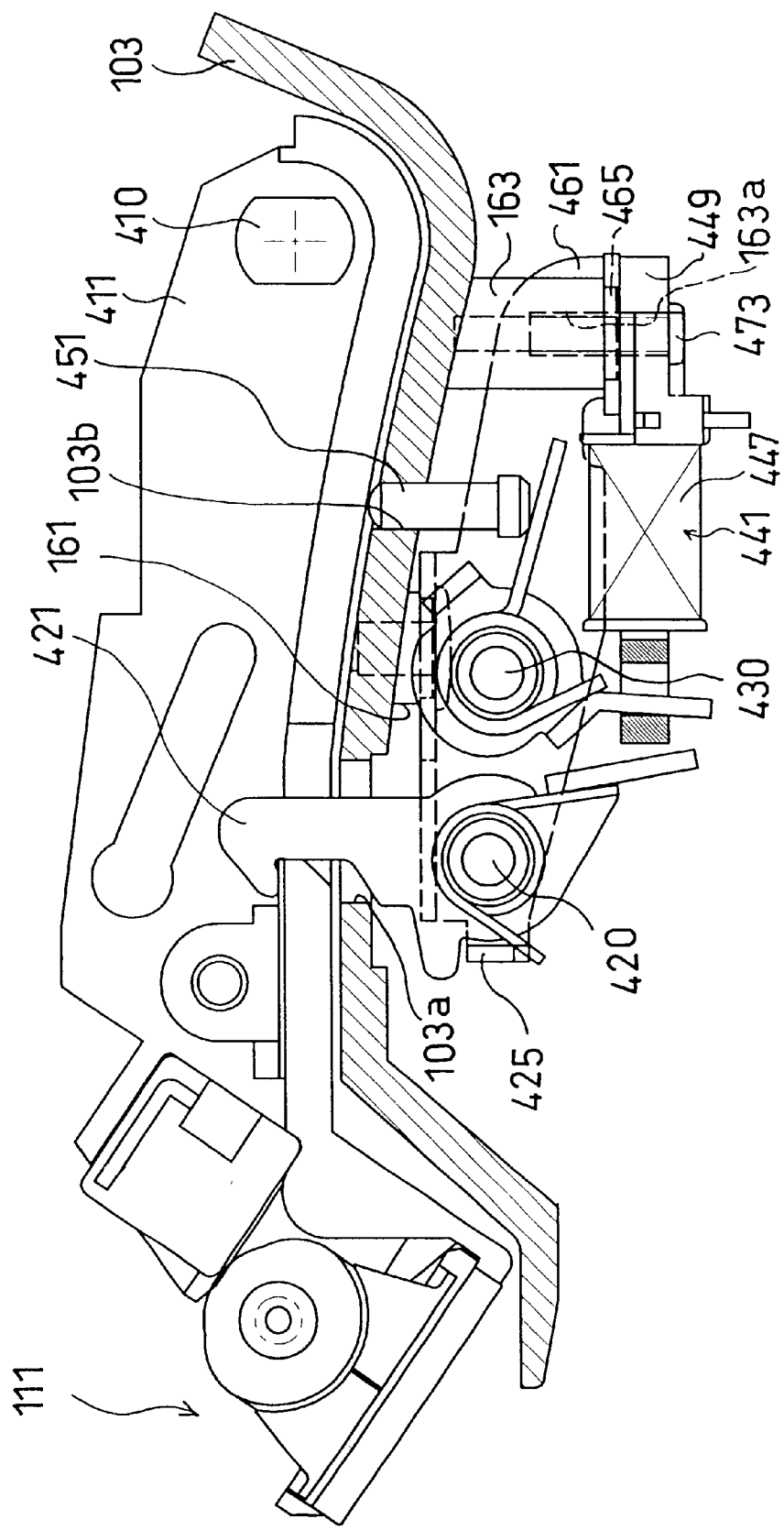
FIG. 13 is a partially sectioned side view of a lock apparatus attached to an upper decorative plate, similar to FIG. 6.

FIG. 11 is an exploded perspective view of the lock apparatus. The engagement lever shaft 420 of the engagement lever 421, the disengagement lever shaft 430 of the disengagement lever 431, and a positioning pin 475 are provided on the base plate 461. The engagement and disengagement levers 421 and 431 are respectively provided with shaft bearing cylinders 426 and 435 integral therewith, which are rotatably fitted on the engagement lever shaft 420 and the disengagement lever shaft 430. The engagement spring 424 and the disengagement spring 433 are wound about the shaft bearing cylinders 426 and 435, respectively. The engagement lever shaft 420 and the disengagement lever shaft 430 are provided on their front ends with E-rings (not shown) fitted thereto to prevent the shaft bearing cylinders 426 and 435 from slipping off.

The base plate 461 is provided with a shaft support portion 461a on which the engagement lever shaft 420 and the disengagement lever shaft 430 are provided, an upper plate portion 461b which is bent at substantially right angles with respect to the upper edge of the shaft support portion 461a, and a lower plate portion 461c which is bent at substantially right angles with respect to the lower edge of the end portion of the shaft support portion 461a that is located away from the engagement lever shaft 420 and the disengagement lever shaft 430. The upper and lower plate portions 461b and 461c extend in opposite directions. The upper and lower plate portions 461b and 461c are provided with first and second positioning/screw-securing holes (first and second through holes) 463 and 465, respectively. A positioning pin hole 467 is formed in the lower plate portion 461c and in the vicinity of the second positioning/screw securing hole 465. The positioning pin 475 which serves as a rotation prevention pin for the electromagnetic plunger 441 is provided in the positioning pin hole 467.

The mounting portion 444 projecting from the rear end of the electromagnetic plunger 441 is provided with a positioning hole 445 in which the positioning pin 475 is fitted and a screw securing hole (third through hole) 446 corresponding to the second positioning/screw-securing hole 465.

The base plate 461 of the engagement mechanism is attached to the upper decorative plate 103, so that the base plate 461 is secured to the camera body 101 by the upper decorative plate 103. The mounting operation is carried out as follows.

Figure 14:
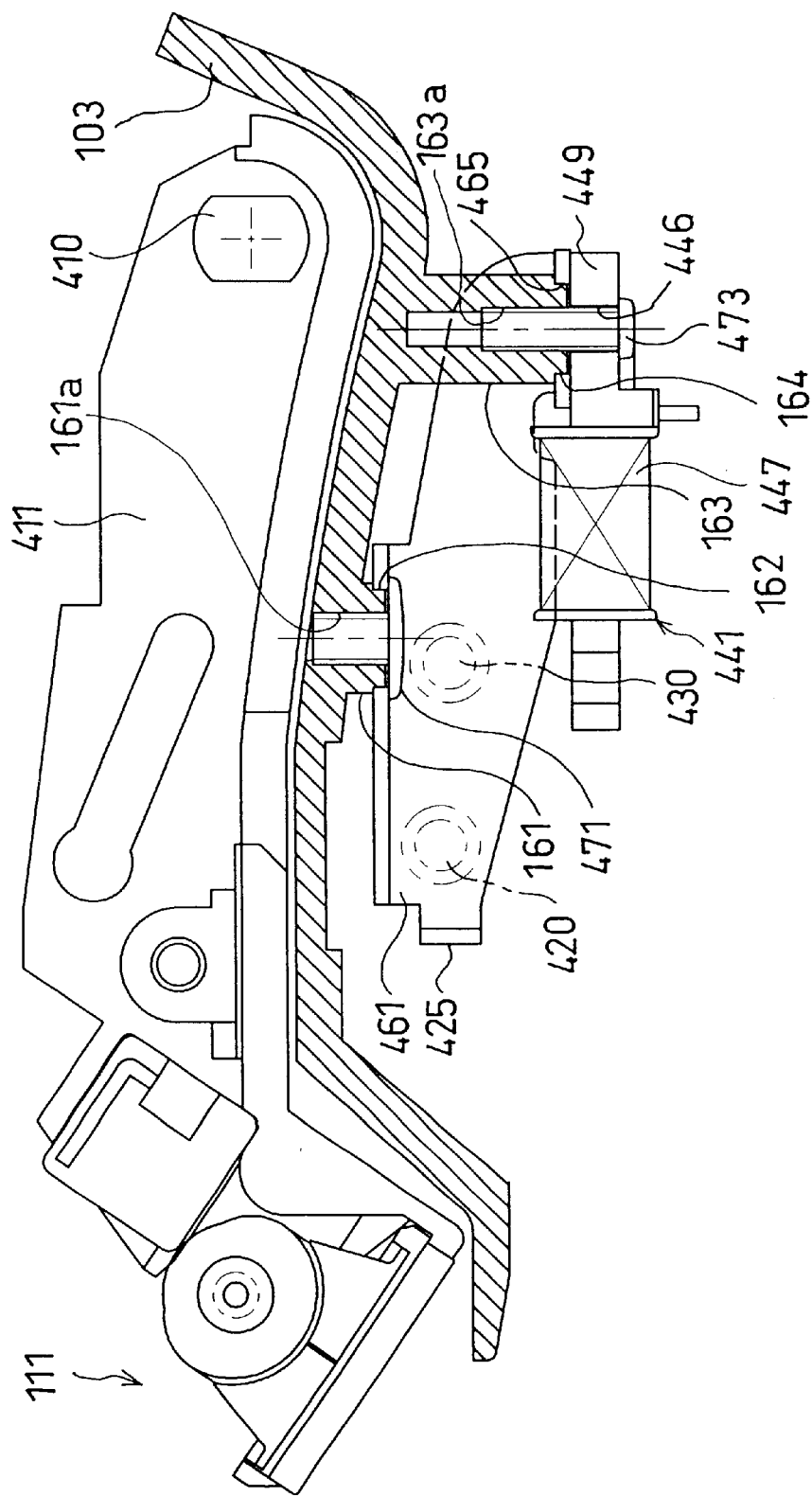
FIG. 14 is a partially sectioned side view of a built-in flash of a single lens reflex camera, taken along a plane passing through a center of a screw, similar to FIG. 6.

The engagement hook 422 of the engagement lever 421 is inserted in the engagement lever hole 103a of the upper decorative plate 103, and a small diameter front end portion 162 of a positioning boss (first positioning projection/base plate securing projection) 161 integrally formed on the inner surface of the upper decorative plate 103 is fitted in the first positioning/screw-securing hole 463, as shown in FIG. 14. At the same time, the small diameter front end portion 164 of the fastening boss (second positioning projection) 163 integrally formed on the inner surface of the upper decorative plate 103 is fitted in the second positioning/screw-securing hole 465. Thereafter, a base plate securing screw (first screw/base plate securing screw) 471 is screwed in a threaded hole 161a (first threaded hole) formed in the positioning boss 161, for the purpose of initial attachment.

The positional adjustment of the base plate 461 with respect to the decorative plate 103 can be carried out due to the front end portions 162 (positioning boss 161) and 164 (positioning boss 163) being fitted into first and second positioning/screw-securing holes 463 and 465, respectively, having a certain amount of horizontal slack in a direction perpendicular to the axes of the first and second positioning/screw-securing holes 463 and 465.

Thereafter, the positioning pin 475 is fitted in the positioning hole 445 of the electromagnetic plunger 441, and the disengagement lever 431 is fitted in the loose-fitting groove 443. A plunger/base plate securing screw (second screw/common securing screw) 473 is screwed into a threaded hole (second threaded hole) 161a formed in the positioning boss 163 through the screw securing hole 446 and the second positioning/screw-securing hole 465 or the purpose of initial attachment.

In this state, the charge pin 451 is inserted in the charge pin hole 103b, so that the second end 433b of the disengagement spring 433 abuts against the head 453 of the charge pin 451 to bias the charge pin 451 in the projection direction. Thereafter, the positions and directions of the engagement lever 421, the disengagement lever 431, and the electromagnetic plunger 441 are adjusted. After the adjustment is finished, the base plate securing screw 471 and the plunger/base plate securing screw 473 are fastened to establish a firm connection.

Thereafter, the upper decorative plate 103 to which the lock apparatus is attached is secured to the camera body 101.

Namely, the positioning boss 161 having the threaded hole 161a, the first positioning/screw-securing hole 463 and the base plate securing screw 471 constitute a first securing device for securing the base plate 461 to the upper decorative plate 103 (camera body 101). Similarly, the positioning boss 163 having the threaded hole 161a, the second positioning/screw-securing hole 465 and the plunger/base plate securing screw 473 constitute a second securing device for securing the electromagnetic plunger 441 to the upper decorative plate 103 (camera body 101) together with the base plate 461.

In order to adjust the position and/or direction of the electromagnetic plunger 441 after assembly or upon repairing, the upper decorative plate 103 is detached from the camera body 101, and the plunger/base plate securing screw 473 is loosened, so that the electromagnetic plunger 441 can be rotated and adjusted about the axis of the positioning pin 475. Upon completion of the adjustment, the plunger/base plate securing screw 473 is fastened. In other words, the positioning hole 445 and the positioning pin 475 rotatably fitted into the positioning hole 445 constitute a position adjustment mechanism to adjust the position of the electromagnetic plunger 441 on the base plate 461 of the lock lever mechanism.

As can be understood from the foregoing, according to the above-mentioned embodiment of the camera, the electromagnetic plunger 441 is rotatably and adjustably mounted to the positioning pin 475 provided on the base late 461 of the lock lever mechanism, without being integrally formed with the base plate 461 to which the engagement lever 421 and the disengagement lever 431 are mounted. Moreover, upon attachment to the upper decorative plate 103, the electromagnetic plunger 441 is connected together with the base plate 461 by the common plunger/base plate securing screw 473. Thus, the position and/or direction of the electromagnetic plunger can be easily carried out.

According to the embodiment of the camera, the engagement lever shaft 420 of the engagement lever 421 which engages with the light emitter 111 of the built-in flash 53 in the retracted position and the disengagement lever shaft 430 of the disengagement lever 431 which releases the engagement of the engagement lever 421 extend in parallel, and are spaced from one another in the forward and rearward direction of the camera body 101. Accordingly, not only can the lateral width of the light emitter 111 and the engagement mechanism be reduced, but also the distance between the light emitter 111 and the mode dial 121 provided aside the light emitter can be set to be large enough to facilitate the ease of operation of the mode dial 121. Moreover, the outer diameter of the mode dial 121 can be sufficiently increased to a desirable size. The shape or structure of the engagement lever 421, the disengagement lever 431 and the electromagnetic plunger 441 is not limited to those in the illustrated embodiment.

As may be understood from the above discussion, according to the present invention, since the position adjustment mechanism can adjust the position of the electromagnetic member when the second securing device has been loosened so that the electromagnetic member is not tightly secured to the base plate, the adjustment of the relative position and/or direction of the electromagnetic member and the lock lever mechanism can be facilitated, and can be carried out even after being attached to the camera.

Moreover, according to the present invention, since the base plate of the lock lever mechanism and the electromagnetic member are fastened together to the outer plate of the camera, the strength and rigidity of the camera body can be enhanced, thus resulting in an increase in the reliability of the built-in flash.

Furthermore, in a built-in flash according to the present invention, since the rotation shafts of the lock lever and the unlocking lever extend in parallel and are spaced from one another in a direction perpendicular to the axes thereof, and hence the lateral width of the light emitter and the support mechanism can be reduced, so that the built-in flash can be made compact as a whole.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A built-in retractable flash of a camera comprising:
   a light emitter which is supported on a camera body to be movable between a retracted position and a light emission position raised from said camera body;
   a lock lever mechanism having a lock lever which is movable between a lock position, wherein said lock lever engages with said light emitter to hold said light emitter in said retracted position, and an unlock position, wherein said lock lever allows said light emitter to move to said light emission position, said lock lever being biased toward said lock position;

a base plate of said lock lever mechanism on which said lock lever is supported;

an electromagnetic member provided on said base plate, said electromagnetic member being adapted to control the position of said lock lever between said lock position and said unlock position;

a position adjustment mechanism for adjusting the position of said electromagnetic member on said base plate; and a first and a second securing device for securing said base plate to said camera body;

wherein said first securing device secures only said base plate to said camera body; and wherein said second securing device secures both said base plate and said electromagnetic member to said camera body after the relative position between said base plate and said electromagnetic member is adjusted by said position adjustment mechanism.

2. The built-in retractable flash according to claim 1, wherein said position adjustment mechanism comprises a positioning pin and a positioning hole in which said positioning pin is fitted, provided on one and the other of said base plate and said electromagnetic member, wherein said electromagnetic member is rotatable with respect to said base plate about the center axis of said positioning pin.

3. The built-in retractable flash according to claim 1, wherein said first securing device comprises:

a first positioning projection formed on said camera body;

a first threaded hole formed in said first positioning projection;

a first through hole formed on said base plate, in which said first positioning projection of said camera body can be inserted; and a first screw which is engaged with said threaded hole in said first through hole and secures said base plate to said positioning projection;

and wherein said second securing device comprises:

a second positioning projection formed on said camera body;

a second threaded hole formed in said second positioning projection;

a second through hole formed on said base plate, in which said second positioning projection of said camera body can be inserted;

a third through hole formed on said electromagnetic member in which said second positioning projection of camera body can be inserted;

a second screw which can be engaged with said second threaded hole through said second and third through holes and secures said electromagnetic member to said second positioning projection together with said base plate.

4. The built-in retractable flash according to claim 3, wherein said first and second positioning projections of said camera body are fitted into said first and second through holes of said base plate, respectively, so as to have a predetermined amount of slack in a direction perpendicular to the axes of said first and second screws, so that the position of said base plate is adjustable with respect to said camera body when said first and second screws are loosened.

5. The built-in retractable flash according to claim 3, wherein said camera body includes an outer plate secured to said camera body, said first and second positioning projections being formed on the inner surface of said outer plate.

6. The built-in retractable flash according to claim 1, wherein said lock lever mechanism further comprises:

an unlocking lever which is supported on said base plate so as to be moved between a lock-allowing position, which allows said lock lever to be positioned in said lock position, and an unlocking-operation position, which moves said lock lever to said unlock position via said electromagnetic member; and a biasing member for biasing said unlocking lever to said unlocking-operation position, wherein a biasing force of said biasing member is stronger than a biasing force which biases said lock lever to said lock position.

7. The built-in retractable flash according to claim 6, wherein said electromagnetic member comprises an armature which is connected with said unlocking lever, a permanent magnet which attracts said armature, and a coil which produces a magnetic force which cancels the magnetic force of said permanent magnet when the coil is supplied with electricity;

wherein when said coil is not supplied with electricity, said armature is attracted by said permanent magnet so that said unlocking lever is held in said lock-allowing position wherein said lock lever is held in said lock position;

wherein when said coil is supplied with electricity, said unlocking lever is moved to said unlocking-operation position by said biasing force of said biasing member so that said armature is engaged with said lock lever and moves said lock lever to said unlock position.

8. A built-in retractable flash of a camera comprising:

a light emitter which is supported on a camera body to be movable between a retracted position and a light emission position raised from said camera body;

a lock lever which is rotatable between a lock position, wherein said lock lever engages with said light emitter to hold said light emitter in said retracted position, and an unlock position, wherein said lock lever allows said light emitter to move to said light emission position;

a first biasing member for biasing said lock lever to said lock position;

an unlocking lever which is rotatable between a lock-allowing position, which allows said lock lever to rotate to said lock position, and an unlocking-operation position, which rotates said lock lever to said unlock position;

a second biasing member for biasing said unlocking lever to said unlocking-operation position, a biasing force of said second biasing member being stronger than a biasing force of said first biasing member;

a base plate on which said lock lever and said unlocking lever are rotatably supported;

an electromagnetic member which holds said unlocking lever in said lock-allowing position against said biasing force of said second biasing member; and wherein said electromagnetic member is secured to said camera body together with said base plate via a common securing screw.

9. The built-in retractable flash of a camera according to claim 8, wherein said base plate is provided with a positioning pin which can be fitted in a positioning hole formed in said electromagnetic member.

10. The built-in retractable flash of a camera according to claim 8, wherein said base plate is secured to a projection formed on said camera body together with said electromagnetic member via said common securing screw.

11. The built-in retractable flash of a camera according to claim 10, further comprising:

a base plate securing projection formed on said camera body; and a base plate securing screw;

wherein said base plate securing screw secures only said base plate to said base plate securing projection of said camera body; and wherein said common securing screw secures both said base plate and said electromagnetic member to said projection of said camera body.

12. The built-in retractable flash of a camera according to claim 8, wherein said electromagnetic member comprises an armature which is connected with said unlocking lever, a permanent magnet which attracts said armature, and a coil which produces a magnetic force which cancels the magnetic force of said permanent magnet when said coil is supplied with an electricity;

wherein said unlocking lever is held in said lock-allowing position when said armature is attracted by said permanent magnet so that said lock lever is positioned in said lock position by biasing force of said first biasing member;

and wherein said unlocking lever is rotated to said unlocking-operation position by said biasing force of said second biasing member when the attracting force of said permanent magnet is canceled by said magnetic force of said coil, so that said lock lever rotates to said unlock position.

13. A built-in retractable flash of a camera, comprising:

a light emitter which is supported on a camera body to be movable between a retracted position and a light emission position raised from said camera body;

a lock lever which is rotatable between a lock position, wherein said lock lever engages with said light emitter so as to lock said light emitter in said retracted position, and an unlock position, wherein said lock lever disengages with said light emitter in order to allow said light emitter to move said light emission position;

a first biasing member for biasing said lock lever to said lock position;

an unlocking lever which is rotatable between a lock-allowing position, which allows said lock lever to be positioned in said lock position, and an unlocking-operation position, wherein said lock lever rotates to said unlock position;

a second biasing member for biasing said unlocking lever to said unlocking-operation position, wherein a biasing force of said second biasing member is stronger than a biasing force of said first biasing member;

first and second rotational shafts which rotatably support said lock lever and said unlocking lever respectively; and an electromagnetic member which holds said unlocking lever in said lock-allowing position when electricity is not supplied to said electromagnetic member, and releases said unlocking lever so as to rotate to said unlocking-operation position when electricity is supplied to said electromagnetic member;

wherein said first and second rotation shafts extend in parallel in a direction of the axes thereof, and are spaced from one another in a direction perpendicular to said axes.

14. The built-in retractable flash according to claim 13, wherein said first rotation shaft of said lock lever and said second rotation shaft of said unlocking lever are spaced from one another in the forward and rearward direction of said camera body.

15. The built-in retractable flash according to claim 13, wherein said first biasing member is a torsion-coiled spring which is wound about said first rotation shaft, and wherein said second biasing member is a torsion-coiled spring which is wound about said second rotation shaft.

16. The built-in retractable flash according to claim 13, wherein said electromagnetic member comprises an armature which is connected with said unlocking lever, a permanent magnet which attracts said armature, and a coil which produces a magnetic force which cancels the magnetic force of said permanent magnet when the coil is supplied with electricity;

wherein when said coil is not supplied with electricity, said armature is attracted by said permanent magnet, and said unlocking lever is held in said lock-allowing position so that said lock lever is held in said lock position;

wherein when said coil is supplied with electricity, said unlocking lever is moved to said unlocking-operation position by biasing force of said second biasing member so that said armature is engaged with said lock lever and moves said lock lever to said unlock position.

17. The built-in retractable flash according to claim 16, further comprising a charge member which compresses said second biasing member to thereby increase the elastic biasing force when said light emitter is in said retracted position, and which allows said second biasing member to expand to thereby allow said armature to be attracted by said permanent magnet when said light emitter is moved in the direction toward said light emission position.

18. The built-in retractable flash according to claim 13, further comprising a third biasing member for biasing said light emitter to said light emission position.

19. The built-in retractable flash according to claim 13, wherein said camera is a single lens reflex camera and wherein said light emitter is provided on a pentagonal roof of said single lens reflex camera.

20. The built-in retractable flash according to claim 13, wherein said first and second rotational shafts are provided on a common base plate.

* * * * *